United States Patent Office 2,732,411
Patented Jan. 24, 1956

2,732,411

PREPARATION OF TETRAFLUOROETHYLENE

Mark W. Farlow, Wilmington, and Earl L. Muetterties, Hockessin, Del., assignors to E. I. du Pont de Nemours and Company, Wilmington, Del., a corporation of Delaware No Drawing. Application June 1, 1955,
Serial No. 512,582

5 Claims. (Cl. 260—653)

This invention relates to a new process for the preparation of tetrafluoroethylene.

Tetrafluoroethylene has achieved outstanding technological success in the form of its polymer. It is also useful as the starting material in the preparation of many vauluable products, for example, the polyfluorinated compounds containing the unit (—$CF_2$—$CF_2$—), such as the acids $H(CF_2—CF_2)_n COOH$ and certain inorganic esters of the alcohols $H(CF_2—CF_2)_n CH_2OH$, these compounds being highly valuable as dispersing agents in the polymerization of the ethylenic monomers. The present industrial synthesis of tetrafluoroethylene, in which the final step is the pyrolysis of chlorodifluoromethane, is a costly one.

This application is a continuation of our copending application Serial No. 481,482, filed January 12, 1955.

This invention has as an object a new process for the preparation of tetrafluoroethylene. A further object is the provision of a simpler process for the preparation of tetrafluoroethylene. Another object is a process lower in cost. Other objects will appear hereinafter.

These objects are accomplished by the present invention of a new process of preparing tetrafluoroethylene which comprises bringing elemental fluorine into contact with carbon at a temperature of at least 1400° C., cooling the reaction product to below about 500° C. within less than one second, immediately thereafter removing any unreacted fluorine from the reaction product, and separating the tetrafluoroethylene from the other fluorocarbons formed. In a preferred embodiment, the reaction is carried out under an absolute pressure lower than atmospheric, preferably less than about 400 mm. of mercury.

An essential condition in obtaining tetrafluoroethylene in the reaction of fluorine with carbon is the reaction temperature. The reaction product contains no appreciable amount of tetrafluoroethylene at reaction temperatures below about 1400° C., the product then consisting chiefly of carbon tetrafluoride, with minor amounts of other saturated fluorocarbons such as hexafluoroethane, octafluoropropane and higher fluorocarbons. Tetrafluoroethylene begins to form at a reaction temperature of about 1400° C. and is present in very appreciable amounts at about 1500° C., which is the preferred minimum reaction temperature. Better conversions are obtained when the reaction temperature is at least 2000° C., however. The temperature can be as high as can practically be obtained. For example, good results are obtained by reacting fluorine with the carbon electrodes of a carbon arc, where the temperature is estimated to be in the range of 2500° C. to 3500° C–4500° C. It should be noted that the reaction is strongly exothermic and supplies a part of the necessary heat input.

Another essential precaution if tetrafluoroethylene is to be obtained is the very rapid cooling of the reaction product. While the chemical processes which occur during this cooling, or quenching, are not well understood, it has been demonstrated that quenching of the product from the reaction temperature to a temperature no higher than about 500° C. is essential to the success of the operation. Moreover, quenching must be very rapid. The time during which the reaction product is cooled, i. e., the time of transition from the reaction temperature to about 500° C., should not exceed one second. It is preferably in the range of from 0.1 second to 0.001 second or less. The critical importance of the quenching step may be seen from a comparison of this process with prior work (Fowler and Burford, MDDC–898, U. S. Atomic Energy Commission, 1943, declassified 1947) in which fluorine was reacted with the carbon electrodes of a carbon arc, without positive provisions to insure very rapid cooling of the effluent gas. In this prior work, the sole reported reaction product was carbon tetrafluoride. In comparison, one embodiment of the present invention uses a similar procedure except that the reaction product is drawn off from the arc through a hollow electrode at high velocity, whereby quick cooling occurs and substantial amounts of tetrafluoroethylene are obtained.

In this reaction the effluent gas after contact between the fluorine and the carbon may contain some unreacted fluorine. This is normally the case when the contact zone is small, as for example when operating in a carbon arc. It has been found essential in order to obtain the desired tetrafluoroethylene to remove any unreacted fluorine from the reaction product as soon as possible following the quenching step. An effective method of doing this consists in treating the effluent gas, immediately after it leaves the cooling zone, with a chemical agent which destroys the fluorine without forming other materials (such as chlorine, bromine, halogen fluorides, etc.) reactive with tetrafluoroethylene. Such means reactive with fluorine at the reaction temperature include water, solid alkali metal hydroxides such as potassium or sodium hydroxides, aqueous solutions of the alkali metal hydroxides, carbonates, or sulfites, and the like. The alkali metal iodides, particularly potassium iodide or sodium iodide, used either in the solid state or in aqueous solutions, are very suitable fluorine-neutralizing means since the iodine which is liberated does not react appreciably with tetrafluoroethylene and serves as indicator of the presence or absence of fluorine. Another very effective absorbing agent is a column of finely divided carbon.

The necessary absence of fluorine from the reaction product can also, of course, be insured or at least favored by taking care that all of the fluorine employed reacts with the carbon. This can be done, particularly when operating in a heated tubular reactor, by using a sufficient excess of carbon to insure complete removal of the fluorine, e. g., by using a reaction zone (i. e., a bed of carbon heated to at least 1400° C.) of sufficient length to achieve this purpose. This particular means for the removal of fluorine from the reaction products is of advantage in that no additional step is employed and the means employed demonstrates (by its absence) when it is used up.

The present process involves therefore a heating step, then a quick cooling (quenching) step. With any given apparatus, the efficiency of the quenching will be primarily a function of the gas velocity, which in turn is a function of the feed rate and the operating pressure. Increasing the feed rate and lowering the pressure results in higher gas velocities and more efficient quenching. Suitable values for feed rate and operating pressure are determined, for each given apparatus, only by the requirement that the time of transition from reaction temperature to about 500° C. be not more than one second, preferably much less as explained above. Thus, it is possible to operate at atmospheric pressure, providing that sufficiently high flow rates are used to satisfy the quenching requirement. However, better conversions are in general obtained by operating at pressures lower than atmospheric, which permit lower feed rates, and this mode of operating is therefore preferred. The absolute pressure in the system can be as low as can be obtained practically, e. g., of the order of 1–2 millimeters of mercury or less. Preferably, the absolute operating pressure is maintained below about 400 mm. of mercury.

The process can be carried out in various ways. For example, the gaseous fluorine can be passed, if desired with an inert carrier gas such as nitrogen, argon or helium, through a column of carbon heated at a temperature of at least 1400° C. in a suitable reactor, e. g., a graphite tube placed inside a resistance-heated furnace or an induction-heated furnace. In this procedure, any appropriate type of heating equipment can be used. A suitable type of induction-heated furnace is described in detail in application Ser. No. 477,678, filed by M. W. Farlow on December 27, 1954, now U. S. Patent 2,709,192. The gaseous reaction products are then immediately (within less than one second) cooled to a temperature below about 500° C. They are then treated to remove the unreacted fluorine, if any is present, in order to minimize or eliminate the possibility of its reacting with the tetrafluoroethylene.

Another highly advantageous mode of operation consists in passing fluorine gas through a carbon arc, wherein it reacts with the carbon electrodes at the arc temperature, and again immediately cooling the reaction product to below 500° C. and removing any free fluorine from it. Suitable forms of carbon arc are described in detail in application Ser. No. 477,678, already referred to, or in application Ser. No. 409,484, filed by M. F. Farlow and E. L. Muetterties on February 10, 1954, now U. S. Patent 2,709,186. These carbon arcs can be operated either at low or high voltage and with either direct or alternating current. Good results are obtained by operating with a current of 3 to 50 volts and of 10–20 amperes, although arc operation is by no means limited to this range of voltage and amperage.

Any form of carbon, whether amorphous or crystalline, is suitable for the purpose of this invention. Thus, there can be used coal, graphite, charcoal, the various forms of carbon black such as lamp black, acetylene black, bone black, etc. While graphite electrodes are preferred for use in the electric arc embodiment, especially good results are obtained with either graphite or active carbon in the heated tubular reactor process. Many well-known varieties of active carbon are available commercially. In general, active carbon is very finely divided, porous carbon having a total surface area of at least 20 square meters per gram (Hassler, "Active Carbon," Chemical Publishing Co., 1951, p. 127). Such finely divided carbons are preferably pelleted, or supported on supports such as coke, so as not to interfere unduly with the passage of the fluorine through the reactor. When using the carbon arc, the activity or state of subdivision of the carbon is apparently of no consequence, but the carbon must, of course, possess sufficient conductivity. The carbon need not be rigorously pure and it may, for example, contain the normal amount of ash, e. g., from 0.5 to 4% by weight in the case of most active carbons.

The reaction gives a mixture of fluorocarbons. In addition to tetrafluoroethylene, carbon tetrafluoride is normally present, and the mixture also contains in general minor quantities of hexafluoroethane and higher fluorocarbons. Tetrafluoroethylene can be separated from the mixture by fractional distillation, for example in a high pressure, low temperature still. There is no special difficulty in separating tetrafluoroethylene from carbon tetrafluoride, since their boiling points differ widely. The separation of tetrafluoroethylene from hexafluoroethane requires more careful fractionation, in view of the small difference in boiling points. If desired, these two components can be separated by selective solvent extraction or by selective adsorption on solids. However, in many cases it is not essential for the tetrafluoroethylene to be completely freed of hexafluoroethane. For example, in the polymerization of tetrafluoroethylene, minor amounts of hexafluoroethane do not interfere with the polymerization process.

The principal by-products of this process, namely, carbon tetrafluoride, and hexafluoroethane, are themselves valuable starting materials for the synthesis of tetrafluoroethylene, since they are converted to it in good yields by contact with carbon at high temperatures, as described in application Ser. No. 477,678, already referred to. Thus, after separation of the tetrafluoroethylene from the reaction product, the other fluorocarbons can be recycled over carbon at the appropriate temperature and the conversion to tetrafluoroethylene, based on the fluorine originally employed, can be made substantially quantitative. Alternatively, the fluorocarbon by-products can be used as a carrier gas for the reaction with carbon of additional quantities of fluorine, whereby a portion at least of this carrier gas is itself converted to the desired tetrafluoroethylene, provided the reaction temperature is high enough (above about 1700° C.).

The following examples in which parts are by weight are illustrative of the invention.

*Example I*

Fluorine was reacted with the carbon electrodes of a carbon arc of essentially the type illustrated in Fig. 3 of application Ser. No. 409,484, already referred to. Briefly described, the anode was a hollow graphite cylinder mounted at the end of a copper tube. The cathode was a solid graphite cylinder mounted on a copper tube having perforations on the end holding the anode. Both copper tubes were water-cooled. The cathode was placed with its end nearly flush with the open end of the hollow anode. The electrodes were mounted in a water-cooled, gas-tight glass jacket which was evacuated to a pressure of a few tenths of a millimeter of mercury. In the operation of this type of arc, the incoming fluorine enters through the perforations in the copper tube holding the carbon cathode and passes through the burning arc. The effluent gas exits through the hollow anode, where most or all of the quenching takes place. It was estimated that the reaction product was cooled to below 500° C. in less than one-tenth of a second.

In this example, the effluent gas passed then through two towers filled with solid sodium iodide which were placed immediately following the anode outlet, so that any unreacted fluorine was removed as soon as possible from the reaction product. Following the sodium iodide towers, the gas passed through a trap cooled in carbon dioxide/acetone, then through a trap cooled in liquid nitrogen.

During a period of 25 minutes, 3 parts of fluorine was passed through the arc operated at 4 volts and a direct current of 16–18 amperes. The pressure on the inlet side of the arc varied from about 1 to about 4 mm. of mercury. It was found at the end of the run that some iodine was present in the first cold trap, indicating that some unreacted fluorine had passed through the arc. In the liquid nitrogen trap was found 2 parts of condensed reaction product which was shown by infrared analysis to contain, in moles per cent, about 10% tetrafluoroethylene, 80% carbon tetrafluoride, 10% hexafluoroethane and traces of octafluoropropane and silicon (IV) fluoride.

*Example II*

In this example the reactor was an induction-heated graphite tube ¾" in diameter and 14" long, packed in the center for a 4" length with granular graphite of 4–8 mesh size. This apparatus was of the type illustrated in Fig. 4 of application Ser. No. 477,678. Quenching took place in the cold section of the tube and it was estimated that the gaseous product was cooled from reaction temperature to below 500° C. in much less than one second, probably in about one-hundredth of a second.

The exit end of the reactor was connected to a tower packed with sodium iodide. Following this, the effluent gas passed through a condensing system as in Example I.

Gaseous fluorine was passed at the rate of 60 g. per hour through the reactor maintained at 1500° C. The inlet pressure of the system was 30 mm. of mercury and the outlet pressure 2 to 3 mm. of mercury. It was found that no iodine had been liberated, showing the absence of unreacted fluorine from the effluent gas. The reaction product condensed in the cold traps amounted to 1.05 parts for each part of fluorine used. This product was shown by infrared analysis to contain, by volume, 4% tetrafluoroethylene, 93% carbon tetrafluoride and small amounts of hexafluoroethane and higher fluorocarbons. In contrast, when the reaction was carried out under essentially similar conditions but at a temperature of 800° C., the resulting fluorocarbon mixture contained no detectable amount of tetrafluoroethylene.

This invention affords a practical and relatively economical method of preparing the technically high valuable tetrafluoroethylene in one step. The above examples are merely illustrative and variations in the procedure will suggest themselves. For example, as already mentioned, the process can be made continuous or semi-continuous by separating the tetrafluoroethylene from the reaction product and recirculating the other fluorocarbons.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. The process for the preparation of tetrafluoroethylene which comprises reacting elemental fluorine with carbon at a temperature of at least 1400° C., immediately quenching the reaction products below about 500° C. and removing any elemental fluorine therefrom.

2. The process for the preparation of tetrafluoroethylene which comprises reacting elemental fluorine with carbon at a temperature of at least 1500° C., immediately quenching the reaction products below about 500° C. and removing any elemental fluorine therefrom.

3. The process for the preparation of tetrafluoroethylene which comprises reaction elemental fluorine with carbon at a temperature of at least 2000° C., immediately quenching the reaction products below about 500° C. and removing any elemental fluorine therefrom.

4. Process of any of claims 1, 2, and 3 wherein the elemental fluorine is removed from the reaction products by contact with a means reactive with elemental fluorine without production of products reactive with tetrafluoroethylene.

5. Process of any of claims 1 to 4 wherein the fluorine is reacted with the carbon at a pressure not higher than 400 mm. of mercury.

References Cited in the file of this patent

UNITED STATES PATENTS

| | | |
|---|---|---|
| 2,456,027 | Simons | Dec. 14, 1948 |
| 2,670,389 | Passino | Feb. 23, 1954 |
| 2,684,987 | Mantell et al. | July 27, 1954 |

FOREIGN PATENTS

| | | |
|---|---|---|
| 525,244 | Great Britain | Aug. 23, 1940 |
| 653,879 | Great Britain | May 30, 1951 |

OTHER REFERENCES

Moissan: Comptes rendus 110 276—(1890).
Humiston: J. Phys. Chem. 23 572—(1919).
Ruff et al.: J. Anorg. allgem. Chem. 192 249—(1930).
Ruff et al.: J. Anorg. allgem. Chem. 217 1—(1934).
Simons et al.: J. Am. Chem. Soc., 61 2962—(1939).
Simons: "Fluorine Chemistry" (Academic Press, New York), 1950, pages 406–414.